(12) United States Patent
Okano et al.

(10) Patent No.: US 8,556,272 B2
(45) Date of Patent: Oct. 15, 2013

(54) MULTILAYER STATIC GASKET WITH SECONDARY COMPRESSION LIMITER

(75) Inventors: Takashi Okano, Commerce Township, MI (US); Hubert Köhler, Betzdorf (DE)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/363,714

(22) Filed: Feb. 1, 2012

(65) Prior Publication Data
US 2012/0193877 A1    Aug. 2, 2012

Related U.S. Application Data

(60) Provisional application No. 61/438,361, filed on Feb. 1, 2011.

(51) Int. Cl.
*F16J 15/08* (2006.01)
(52) U.S. Cl.
USPC .......................... 277/593; 277/594
(58) Field of Classification Search
USPC .................................. 277/590–598
See application file for complete search history.

(56) References Cited

U.S. PATENT DOCUMENTS

| | | | |
|---|---|---|---|
| 5,601,292 A | 2/1997 | Tanaka et al. |
| 5,927,724 A | 7/1999 | Maschmann et al. |
| 6,283,480 B1 | 9/2001 | Miura et al. |
| 6,431,554 B1 | 8/2002 | Miyamoto et al. |
| 6,499,743 B2 | 12/2002 | Sadowski |
| 6,565,098 B2 | 5/2003 | Bleyh |
| 6,708,982 B2 | 3/2004 | Zerfass et al. |
| 6,796,562 B2 | 9/2004 | Stapel |
| 6,827,352 B2 | 12/2004 | Ueta et al. |
| 6,918,597 B2 | 7/2005 | Egloff |
| 6,923,450 B2 | 8/2005 | Unseld et al. |
| 6,926,282 B2 | 8/2005 | Werz et al. |
| 6,951,338 B2 | 10/2005 | Kestly |
| 7,086,651 B2 | 8/2006 | Zerfass et al. |
| 7,204,491 B2 | 4/2007 | Hatamura et al. |
| 7,374,177 B2 | 5/2008 | Tripathy et al. |
| 7,527,269 B2 | 5/2009 | Tiefenbach et al. |
| 7,559,556 B2 | 7/2009 | Belter et al. |
| 7,815,197 B2 | 10/2010 | Ueta |
| 7,909,337 B2 | 3/2011 | Ueta et al. |
| 7,997,585 B2 | 8/2011 | Werz et al. |

(Continued)

OTHER PUBLICATIONS

International Search Report PCT/US2012/023494 mailed on May 16, 2012.

*Primary Examiner* — Gilbert Lee
(74) *Attorney, Agent, or Firm* — Robert L. Stearns; Dickinson Wright, PLLC

(57) ABSTRACT

A multilayer metal static cylinder head gasket for establishing a gas/fluid-tight seal between a cylinder head and an engine block includes a pair of functional layers having openings configured to register with a combustion chamber and annular seal beads configured to form a seal about the openings. The gasket further includes a primary compression limiter formed of a separate piece of material from the functional layers. The primary compression limiter extends at least partially about the openings to facilitate inhibiting the seal beads from being fully flattened between the cylinder head and the engine block. The pair of functional layers have nested protrusions forming a secondary compression limiter spaced radially outwardly from the primary compression limiter to further inhibit the seal beads from being fully flattened between the cylinder head and the engine block.

19 Claims, 4 Drawing Sheets

(56) References Cited

U.S. PATENT DOCUMENTS

2003/0042689 A1 3/2003 Diez et al.
2006/0232017 A1* 10/2006 Hamada et al. .............. 277/594
2007/0096401 A1 5/2007 Sueda
2010/0025940 A1 2/2010 Uchida et al.
2010/0327540 A1 12/2010 Okano et al.
2011/0192369 A1 8/2011 Schmitz

* cited by examiner

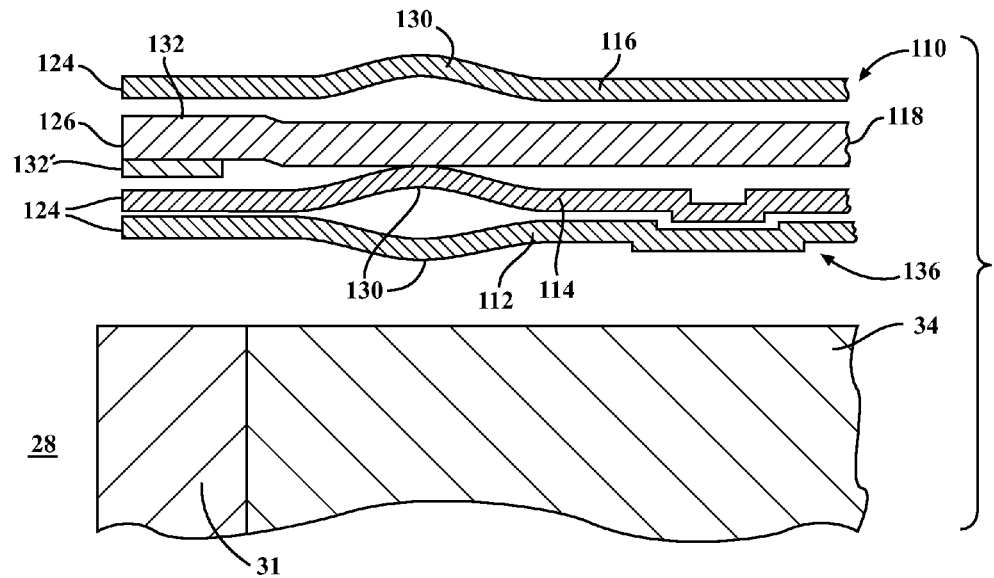
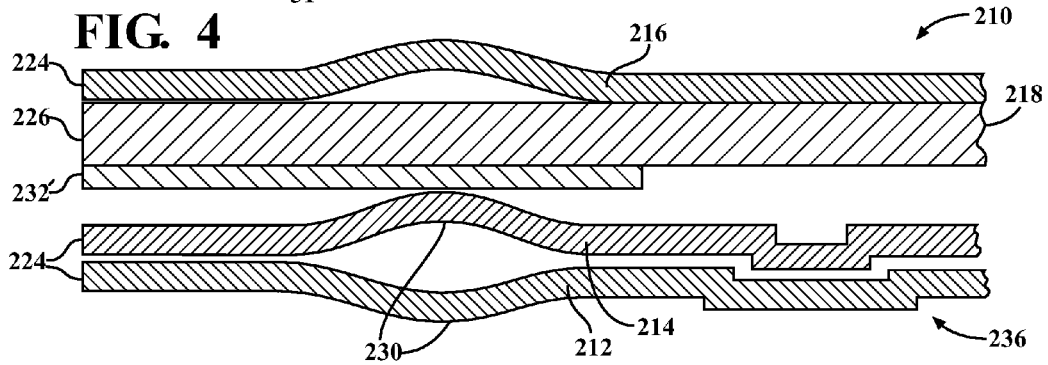
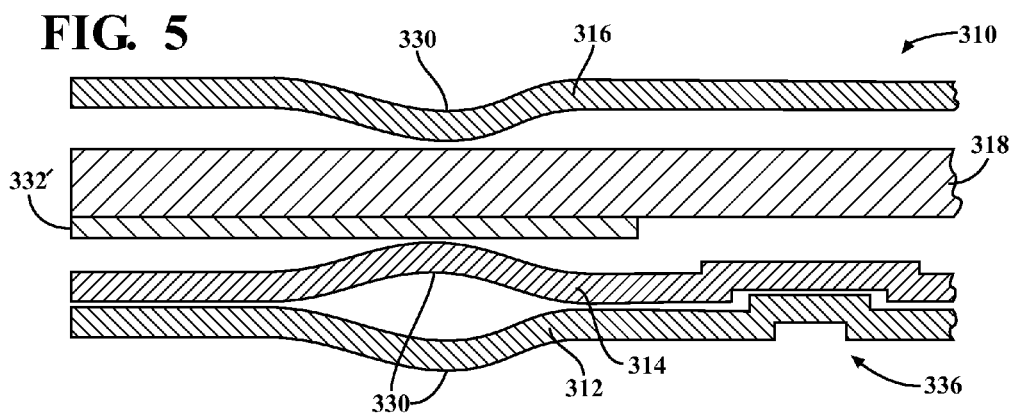

MULTILAYER STATIC GASKET WITH SECONDARY COMPRESSION LIMITER

CROSS-REFERENCE TO RELATED APPLICATION

This application claims the benefit of U.S. Provisional Application Ser. No. 61/438,361, filed Feb. 1, 2011, which is incorporated herein by reference in its entirety.

BACKGROUND OF THE INVENTION

1. Technical Field

This invention relates generally to static gaskets of the type used to establish a gas/fluid-tight seal between two members to be clamped together, and more particularly to multilayer static gaskets, such as a cylinder head gasket.

2. Related Art

In establishing a gas/fluid-tight seal between two members to be clamped together, such as a cylinder head and engine block, it is common to use a static cylinder head gasket having multiple layers. Generally, at least one of the layers of the multilayer gasket, sometimes referred to as a functional layer, has a seal bead to facilitate establishing a gas/fluid tight seal. Another of the layers, sometimes referred to as a distance layer, is configured to abut the functional layer in an effort to establish the gas/fluid tight seal by compressing the seal bead of the functional layer. Unfortunately, while fastening the cylinder head to the engine block, or during high loading in use, damage can occur to the seal bead or other regions of the gasket, such as peripheral regions adjacent fasteners, through over-compression of the gasket. If the seal bead is over-compressed, and completely flattened, in addition to losing its ability to exert a sufficiently high compression sealing pressure between the members being sealed, fatigue cracks can result in the area of the seal beads, such as during clamping and/or while in use. The fatigue cracks ultimately reduce the ability of the static gasket to establish and/or maintain a gas/fluid-tight seal, thereby diminishing the life and performance of the engine.

SUMMARY OF THE INVENTION

A multilayer metal static cylinder head gasket for establishing a gas/fluid-tight seal between a cylinder head and an engine block includes a pair of functional layers having openings configured to register with a combustion chamber and annular seal beads configured to form a seal about the openings. The gasket further includes a primary compression limiter formed of a separate piece of material from the functional layers. The primary compression limiter extends at least partially about the openings to prevent the seal beads from being fully flattened between the cylinder head and the engine block. The pair of functional layers have nested protrusions forming a secondary compression limiter spaced radially outwardly from the primary compression limiter.

BRIEF DESCRIPTION OF THE DRAWINGS

These and other aspects, features and advantages of a multilayer gasket constructed in accordance with the invention will become more readily appreciated when considered in connection with the following detailed description of presently preferred embodiments and best mode, appended claims and accompanying drawings, in which:

FIG. 3 is a view similar to FIG. 2 of a multilayer cylinder head gasket constructed in accordance with another aspect of the invention;

FIGS. 4-7 illustrate radial cross-sectional views of multilayer cylinder head gaskets constructed in accordance with further aspects of the invention.

DETAILED DESCRIPTION OF PRESENTLY PREFERRED EMBODIMENTS

Figure 1:
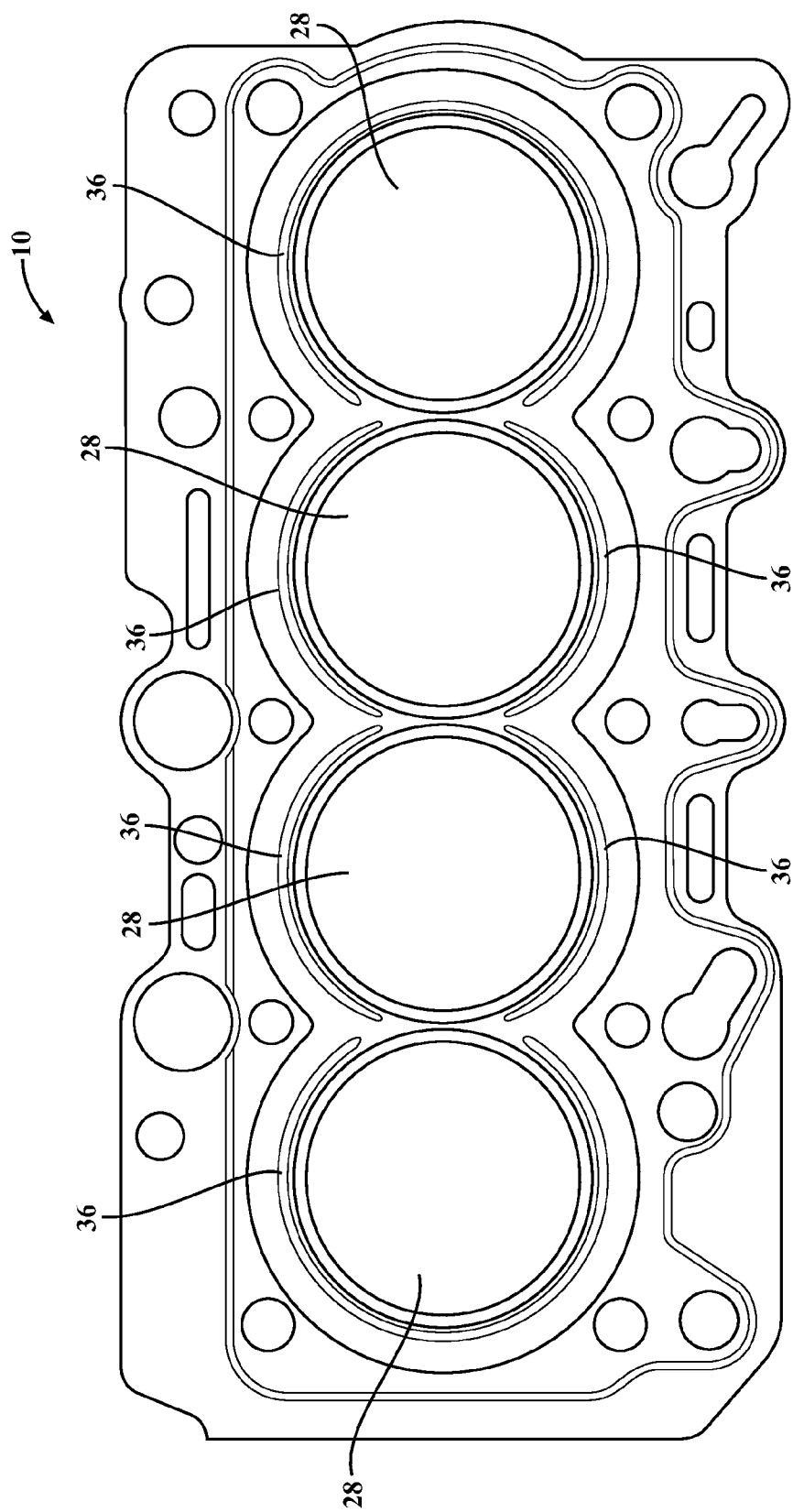
FIG. 1 is a plan view of a multilayer gasket constructed in accordance with one aspect of the invention.
Figure 2:
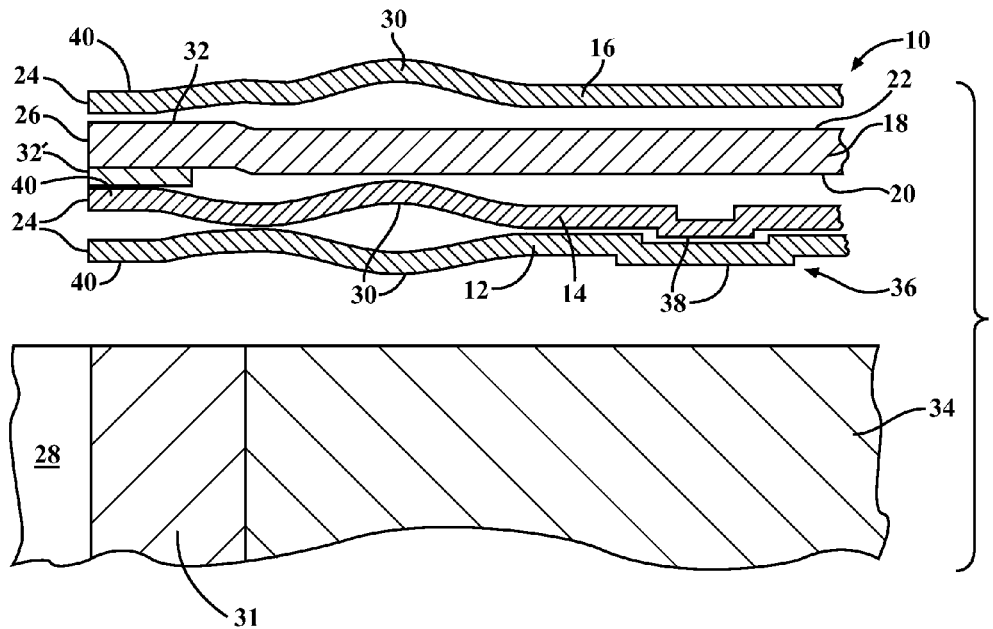
FIG. 2 is a radial cross-sectional side view taken generally along the line 2-2 of FIG. 1.
Figure 2A:
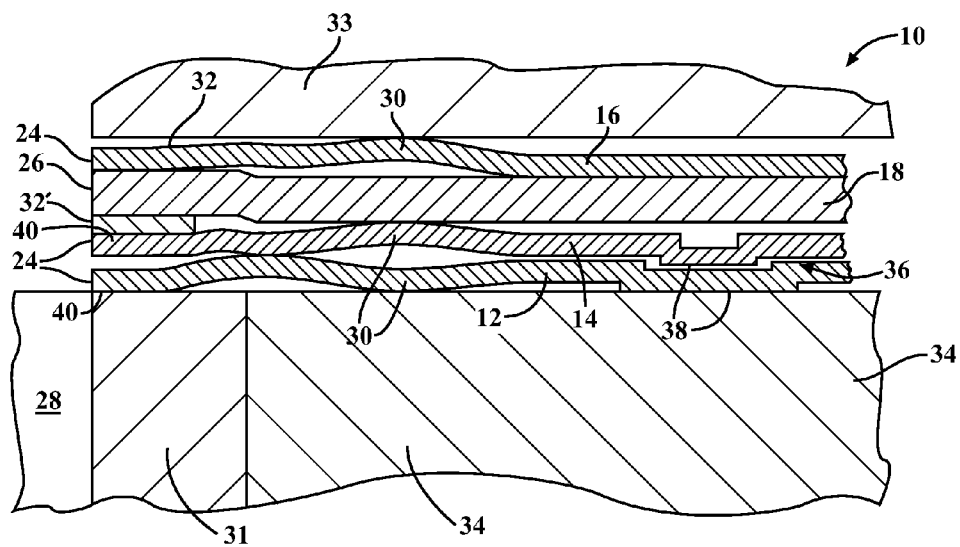
FIG. 2A is view similar to FIG. 2 showing the multilayer gasket assembled between a cylinder head and engine block.

Referring in more detail to the drawings, FIG. 1 illustrates a multilayer static gasket 10, referred to hereafter as gasket, constructed in accordance with one aspect of the invention. The gasket 10 illustrated is a cylinder head gasket and has a plurality of functional layers, shown in accordance with one embodiment in FIG. 2 as three functional layers 12, 14, 16, by way of example, and a distance layer 18. As shown in FIG. 2, at least a pair of the functional layers 12, 14 are arranged to overlie one side 20 of the distance layer 18, with the other distance layer 16 being shown as overlying an opposite side 22 of the distance layer 18. Accordingly, the distance layer 18 is sandwiched between the pair of functional layers 12, 14 and the other functional layer 16. The functional layers 12, 14, 16 each have an opening 24 sized to at least partially register with an opening 26 in the distance layer 18, wherein the respective openings 24, 26 are each arranged in axial alignment with one another to register at least partially with a cylinder bore 28, shown be formed via a cylinder liner 31. The pair of functional layers 12, 14 each have full compression seal beads 30 extending outwardly from a plane of the functional layers 12, 14 in mirrored relation from one another to facilitate establishing a gas-tight seal about the cylinder bore 28 and the other functional layer 16 also has a full bead 30 extending outwardly and away from the distance layer 18. Further, a first primary compression limiter, also referred to as stopper, shown generally at 32, is formed in the distance layer 18. The primary compression limiter 32 inhibits the full beads 30 from being completely flattened upon fastening the cylinder head 33 to the engine block 34 (FIG. 2A). In addition to the primary compression limiter 32, a secondary compression limiter, also referred to as secondary stopper, shown generally at 36, is formed in the pair of functional layers 12, 14. The secondary compression limiter 36 is formed as a pair of nested beads 38 extending axially outwardly from the respective planes of the functional layers 12, 14 and away from the distance layer 18. As such, the full beads 30 that facilitate establishing the gas/fluid tight seal about combustion chamber 28 are assured of remaining less than fully axially compressed or flattened, thereby maintaining a generally constant, high sealing pressure against the distance layer 18 relative to the remaining portion of the functional layers, thereby providing a gas/fluid tight seal about the circumference of the cylinder bore 28. In addition, the nested secondary compression limiters 36 prevent the premature fatigue of the functional layers 12, 14, 16 and the distance layer 18 by inhibiting the formation of fatigue cracks during installation and during use.

The functional layers 12, 14, 16 are constructed from a resilient metal, such as spring steel, for example, and can be provided having a thickness of about 0.1 to 0.3 mm, for example. The pair of functional layers 12, 14, as shown in FIG. 2, are constructed having generally mirrored profiles facing one another, with the exception of the secondary compression limiters 36, with each having the aforementioned full beads 30 adjacent the cylinder bore 28, with half beads 40 being formed to extend in mirrored relation with one another to an outer periphery immediately adjacent the cylinder chambers 28. The half beads 40 are shown as extending axially away in spaced relation from another. Accordingly, the full beads 30 are formed radially outwardly from the half beads 40, relative to the cylinder bore 28, with the secondary compression limiters 36 being formed radially outwardly from the full beads 30, again relative to the cylinder bore 28.

The distance layer 18 can be constructed from a relatively rigid metal material, such as cold rolled steel or stainless steel, for example. The distance layer 18 can be constructed as a flat, planar sheet, or it can be formed having the raised primary compression limiters 32 extending axially outward about the combustion chambers 28.

In addition to the primary compression limiter 32 formed in the distance layer 18, an annular second primary compression limiter 32' can be disposed outwardly from between the functional layers 12, 14 within an annular recess formed by the axially offset surface of the first primary compression limiter 32. The first primary compression limiter 32 is shown as being configured to abut the raised surface of the half bead 40 of one of the functional layers 16, while the second primary compression limiter 32' is shown as being configured to abut the raised surface of the half bead 40 of one of the pair of functional layers, shown as the functional layer 14 abutting the distance layer 18. The second primary compression limiter 32' is constructed of a piece of separate material from the distance layer 18 and is entirely confined between the full beads 30 and the openings 24, thereby not extending beyond the full beads 30 and into the openings 24.

The secondary compression limiters 36 are formed to extend about at least a portion of the full beads 30 radially outwardly from the primary compression limiters 32, 32' and the full beads 30. As best shown in FIG. 1, the secondary compression limiters 36 extend less than fully about the combustion chambers 28 due to the limited space between adjacent combustion chambers 28. The secondary compression limiters 36 that extend about the end combustion chambers 28 in a string of combustion chambers extend uninterrupted about the partial circumferential length, shown as extending between about 275 to 315 degrees, by way of example. In contrast, the secondary compression limiters 36 that extend about intermediate combustion chambers formed between the end combustion chambers are formed in interrupted segments, such that pairs of segments extend about each intermediate combustion chamber 28 on opposite sides of the combustion chambers 28. As shown, each segment of the pair of secondary compression limiters 36 extends between about 75 to 110 degrees, by way of example. Of course, if space permits, the secondary compression limiters 36 could be formed to extend entirely about the combustion chamber 28, though this would require increasing the size of the engine block 34 as more space would be required between adjacent combustion chambers.

The nested secondary compression limiters 36 that are shown as being generally step shaped, by way of example, in addition to preventing the over compression of the functional layers 12, 14, 16, which in turn reduces the risk of premature fatigue cracking, facilitate locating the abutting functional layers 12, 14 relative to one another. Accordingly, assembly is made easier, and thus, more economical. The axial height of the secondary compression limiters 36 extend in an axial direction opposite the second primary compression limiter 32', preferably less than the height of the full adjacent full beads 30, thereby ensuring the full beads 30 are elastically deformed during assembly. As such, the seal formed by the full beads 30 is assured of being perfected, though not being over compressed to the point of full plastic deformation or cracking.

FIG. 3 illustrates another multilayer gasket 110 constructed according to another aspect of the invention, wherein the same reference numerals used above offset by 100 are used to illustrate like features of the gasket 110. As with the gasket 10 described above, the gasket 110 includes a pair of functional layers 112, 114 having full beads 130 extending about the combustion chambers 128 to form gas/fluid tight seals thereabout, along with another functional layer 116, with a distance layer 118 being sandwiched between the abutting pair of functional layers 112, 114 and the functional layer 116. Further, the distance layer 118 has a primary compression limiter 132 formed therein with a supplemental primary compression limiter 132' as described above. Further, the pair of functional layers 112, 114 have nested secondary compression limiters 136 radially outward from their respective full beads 130. The notable difference is in the configuration of the functional layers 112, 114, 116. In contrast to the previously described functional layers 12, 14, 16, the functional layers 112, 114, 116 do not have half beads immediately adjacent the combustion chambers 128, but rather, extend generally coplanar with the sheet of material used to form the main body of the functional layers 112, 114, 116. As such, other than the full beads 130 and the secondary compression limiters 136, the functional layers 112, 114, 116 are planar. Otherwise, the gasket 110 is the same as the gasket 10 discussed above, and thus, no further discussion is needed.

FIG. 4 illustrates another multilayer gasket 210 constructed according to another aspect of the invention, wherein the same reference numerals used above offset by 200 are used to illustrate like features of the gasket 210. As with the gaskets 10, 110 described above, the gasket 210 includes a pair of functional layers 212, 214 having full beads 230 with a distance layer 218 sandwiched between the pair of functional layers 212, 214 and another functional layer 216. Further, the stacked, abutting pair of functional layers 212, 214 have a nested secondary compression limiter 236 radially outward from their mirrored full beads 230. The notable difference is in the configuration of the distance layer 218 and the primary compression limiter 232'. In contrast to the previously described distance layers 18, 118, the distance layer 218 is flat, such that the opposite sides are planar. Further, the primary compression limiter 232' extends generally flush from openings 224, 226 in the functional layers 212, 214, 216 and from the opening 226 in the distance layer 218 radially outwardly beyond the full beads 230, but terminating radially inwardly from the secondary compression limiter 236. Otherwise, the gasket 210 is the same as the gasket 110 discussed above, and thus, no further discussion is needed.

FIG. 5 illustrates another multilayer gasket 310 constructed according to another aspect of the invention, wherein the same reference numerals used above offset by 300 are used to illustrate like features of the gasket 310. As with the gaskets 10, 110, 210 described above, the gasket 310 includes a pair of functional layers 312, 314 having full beads 330 with a distance layer 318 sandwiched between the abutting pair of functional layers 312, 314 and a functional layer 316. Further, the stacked pair of functional layers 312, 314 have a nested secondary compression limiter 336 radially outward from their mirrored full beads 330. The notable difference is in the configuration of the secondary compression limiter 336 and the functional layer 316. In contrast to the previously described secondary compression limiters, the nested secondary compression limiter 336 extends axially toward the distance layer 318 and protrudes toward the primary compression limiter 332', rather than axially away from the distance layer, as in the previous embodiments. Further, the functional layer 316 has a full bead 330 that extends axially toward the distance layer 318, rather than axially away, as in the previous embodiments. Otherwise, the gasket 310 is the same as the gasket 210 discussed above, and thus, no further discussion is needed.

Figure 6:
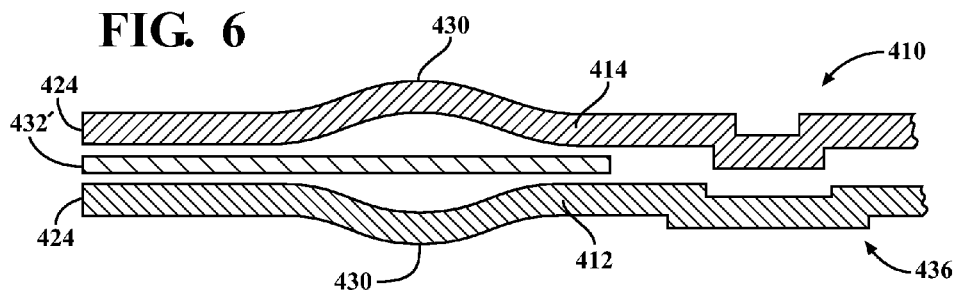
Figure 6A:
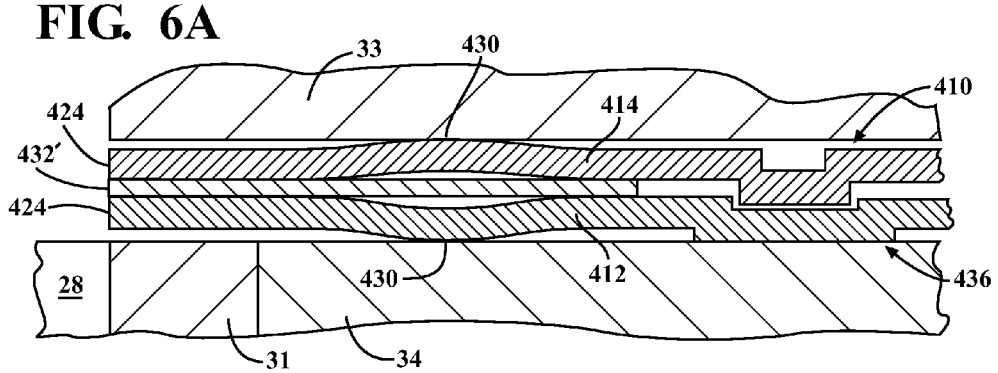
FIGS. 6A and 7A are views similar to FIGS. 6 and 7, respectively, showing the multilayer gaskets assembled between a cylinder head and engine block.

FIG. 6 illustrates another multilayer gasket 410 constructed according to another aspect of the invention, wherein the same reference numerals used above offset by 400 are used to illustrate like features of the gasket 410. As with the gaskets 10, 110, 210, 310 described above, the gasket 410 includes a pair of functional layers 412, 414 having full beads 430. The full beads 430 are illustrated in mirrored relation with peaks facing axially away from one another. Further, a primary compression limiter 432' is disposed between the functional layers 412, 414 such that it extends in sandwiched relation between the functional layers 412, 414 generally flush from openings 424 in the functional layers 412, 414 radially outwardly across the full beads 430. The primary compression limiter 432' stops short of a nested secondary compression limiter 436. Accordingly, in the region of the primary compression limiter 432' the functional layers 412, 414 do not abut one another. However, unlike the previous embodiments, it does not include a distance layer sandwiched between the pair of functional layers 412, 414. Rather, the pair of functional layers 412, 414 are the only functional layers present, wherein the pair of functional layers 412, 414 have the nested secondary compression limiter 436 radially outward from both the primary compression limiter 432' and the full beads 430. As shown in FIG. 6A, the nested secondary compression limiter 436 prevents the full beads 430 from being completely flattened upon assembling the gasket 410 between the cylinder head 33 and engine block 34.

Figure 7:
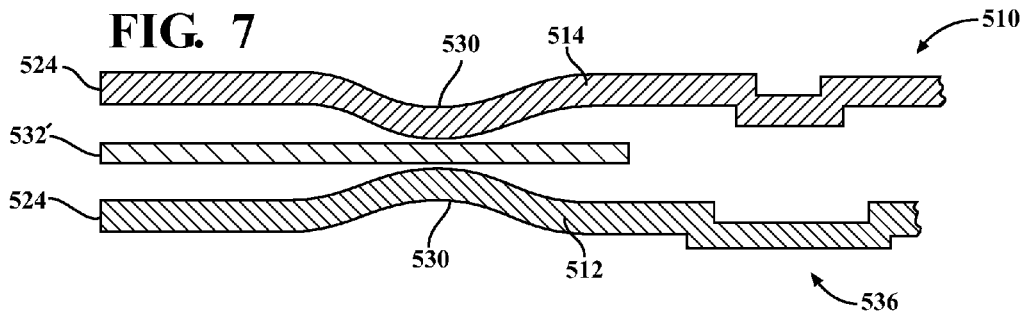
Figure 7A:
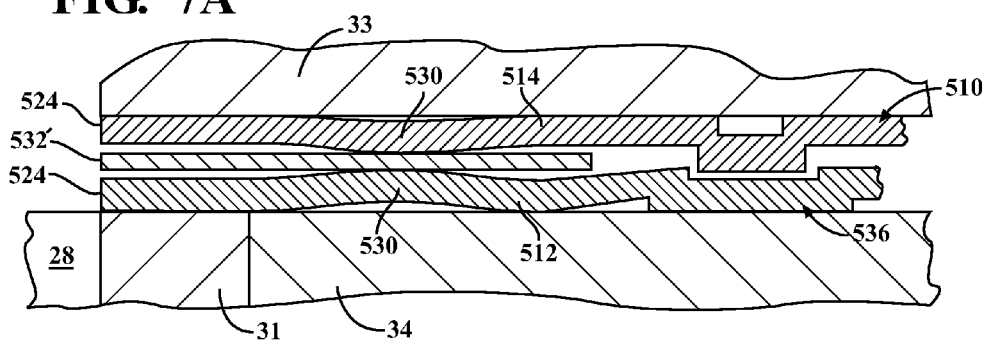

FIG. 7 illustrates another multilayer gasket 510 constructed according to another aspect of the invention, wherein the same reference numerals used above offset by 500 are used to illustrate like features of the gasket 510. As with the gaskets 10, 110, 210, 310, 410 described above, the gasket 510 includes a pair of functional layers 512, 514 having full beads 530. Further, a primary compression limiter 532' is disposed in sandwiched relation between the functional layers 512, 514, as with the gasket 410. However, unlike the full beads 430 of the previous gasket 410, the full beads 530 extend axially toward one another such that their peaks abut the primary compression limiter 532'. Otherwise, the gasket 510 is the same as the gasket 410 discussed above, including having a nested secondary compression limiter 536, and thus, no further discussion is needed. As shown in FIG. 7A, the nested secondary compression limiter 536 prevents the full beads 530 from being completely flattened upon assembling the gasket 510 between the cylinder head 33 and engine block 34.

Obviously, many modifications and variations of the present invention are possible in light of the above teachings. It is, therefore, to be understood that within the scope of the appended claims and any allowed claims related to this application, the invention may be practiced in ways other than described above and illustrated.

What is claimed is:

1. A multilayer metal static cylinder head gasket for establishing a gas/fluid-tight seal between a cylinder head and an engine block, comprising:

a pair of functional layers having openings configured to register with a combustion chamber and annular seal beads configured to form a seal about said openings;

a primary compression limiter formed of a separate piece of material from said functional layers, said primary compression limiter extending at least partially about said openings to prevent said seal beads from being fully flattened between the cylinder head and the engine block;

said pair of functional layers having nested protrusions forming a secondary compression limiter spaced radially outwardly from said primary compression limiter; and wherein said primary compression limiter is disposed between said pair of functional layers.

2. The multilayer metal static cylinder head gasket of claim 1 wherein said primary compression limiter extends across said annular seal beads.

3. The multilayer metal static cylinder head gasket of claim 2 wherein said annular seal beads are full beads configured in mirrored relation extending away from one another.

4. The multilayer metal static cylinder head gasket of claim 2 wherein said annular seal beads are full beads configured in mirrored relation extending toward one another.

5. A multilayer metal static cylinder head gasket for establishing a gas/fluid-tight seal between a cylinder head and an engine block, comprising:

a pair of functional layers having openings configured to register with a combustion chamber and annular seal beads configured to form a seal about said openings;

a primary compression limiter formed of a separate piece of material from said functional layers, said primary compression limiter extending at least partially about said openings to prevent said seal beads from being fully flattened between the cylinder head and the engine block;

said pair of functional layers having nested protrusions forming a secondary compression limiter spaced radially outwardly from said primary compression limiter; and wherein said primary compression limiter is disposed outwardly from said pair of functional layers.

6. The multilayer metal static cylinder head gasket of claim 5 wherein said primary compression limiter is confined between said annular seal beads and said openings.

7. The multilayer metal static cylinder head gasket of claim 6 wherein said pair of functional layers have half beads configured in mirrored relation radially inwardly from said annular seal beads and said primary compression limiter overlies one of said half beads.

8. The multilayer metal static cylinder head gasket of claim 7 wherein said half beads extend away from one another.

9. The multilayer metal static cylinder head gasket of claim 7 wherein said primary compression limiter faces one direction and said nested protrusions protrude toward a direction opposite said one direction.

10. The multilayer metal static cylinder head gasket of claim 5 further comprising a distance layer abutting said primary compression limiter and one of said annular seal beads.

11. The multilayer metal static cylinder head gasket of claim 10 further comprising another functional layer having an opening configured to register with a combustion chamber, said another functional layer overlying and abutting said distance layer.

12. The multilayer metal static cylinder head gasket of claim 11 wherein said another functional layer has a full bead.

13. The multilayer metal static cylinder head gasket of claim 5 wherein said primary compression limiter extends across said annular seal beads.

14. The multilayer metal static cylinder head gasket of claim 13 wherein said primary compression limiter is confined between said secondary compression limiter and said openings.

15. The multilayer metal static cylinder head gasket of claim 14 wherein said nested protrusions protrude toward said primary compression limiter.

16. The multilayer metal static cylinder head gasket of claim 5 wherein said primary compression limiter faces one direction and said nested protrusions protrude toward a direction opposite said one direction.

17. The multilayer metal static cylinder head gasket of claim 5 further comprising a distance layer abutting said primary compression limiter.

18. The multilayer metal static cylinder head gasket of claim 17 further comprising another functional layer having an opening configured to register with a combustion chamber, said another functional layer overlying and abutting said distance layer.

19. The multilayer metal static cylinder head gasket of claim 18 wherein said another functional layer has a full bead extending toward said distance layer.

* * * * *